Patented Mar. 13, 1934

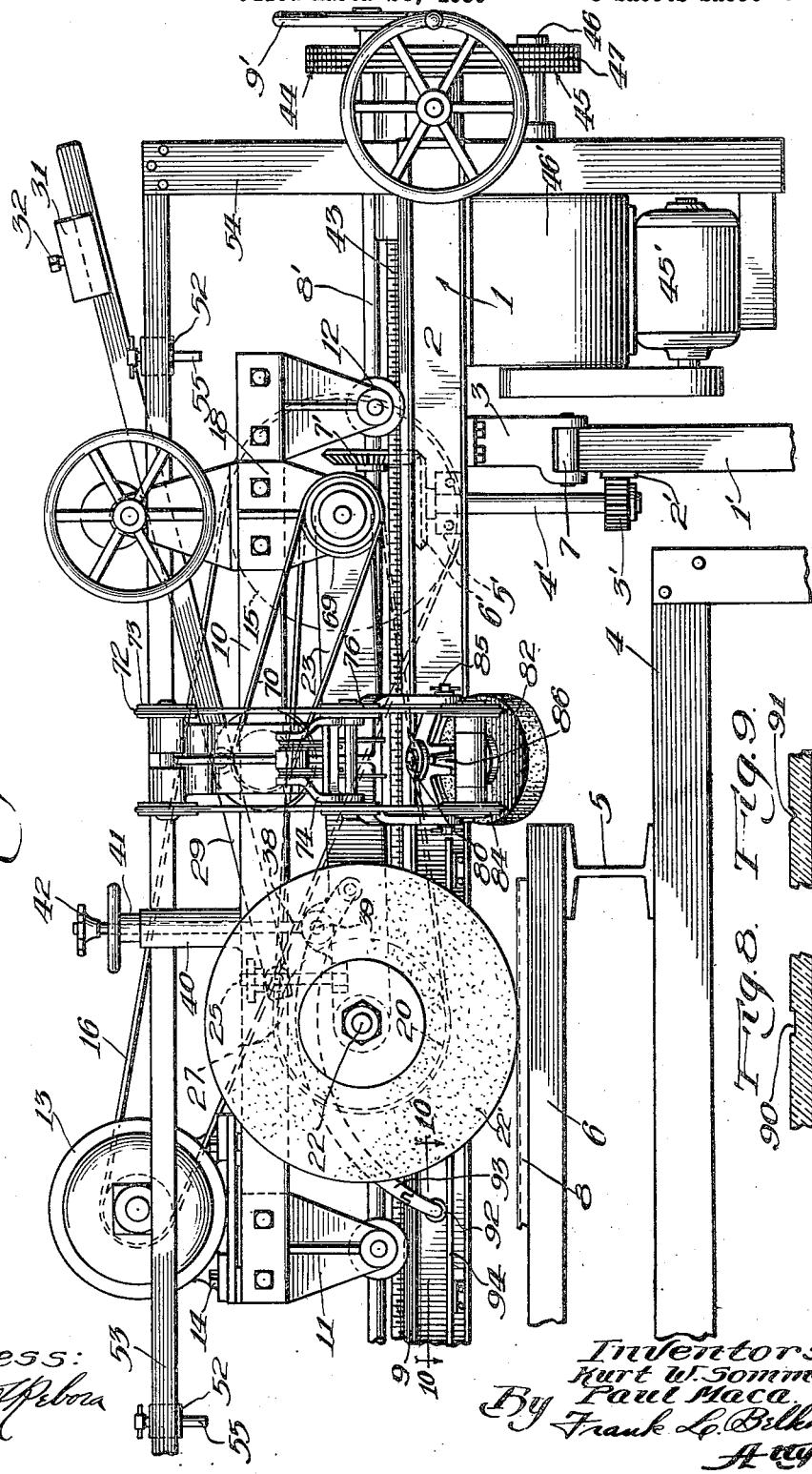

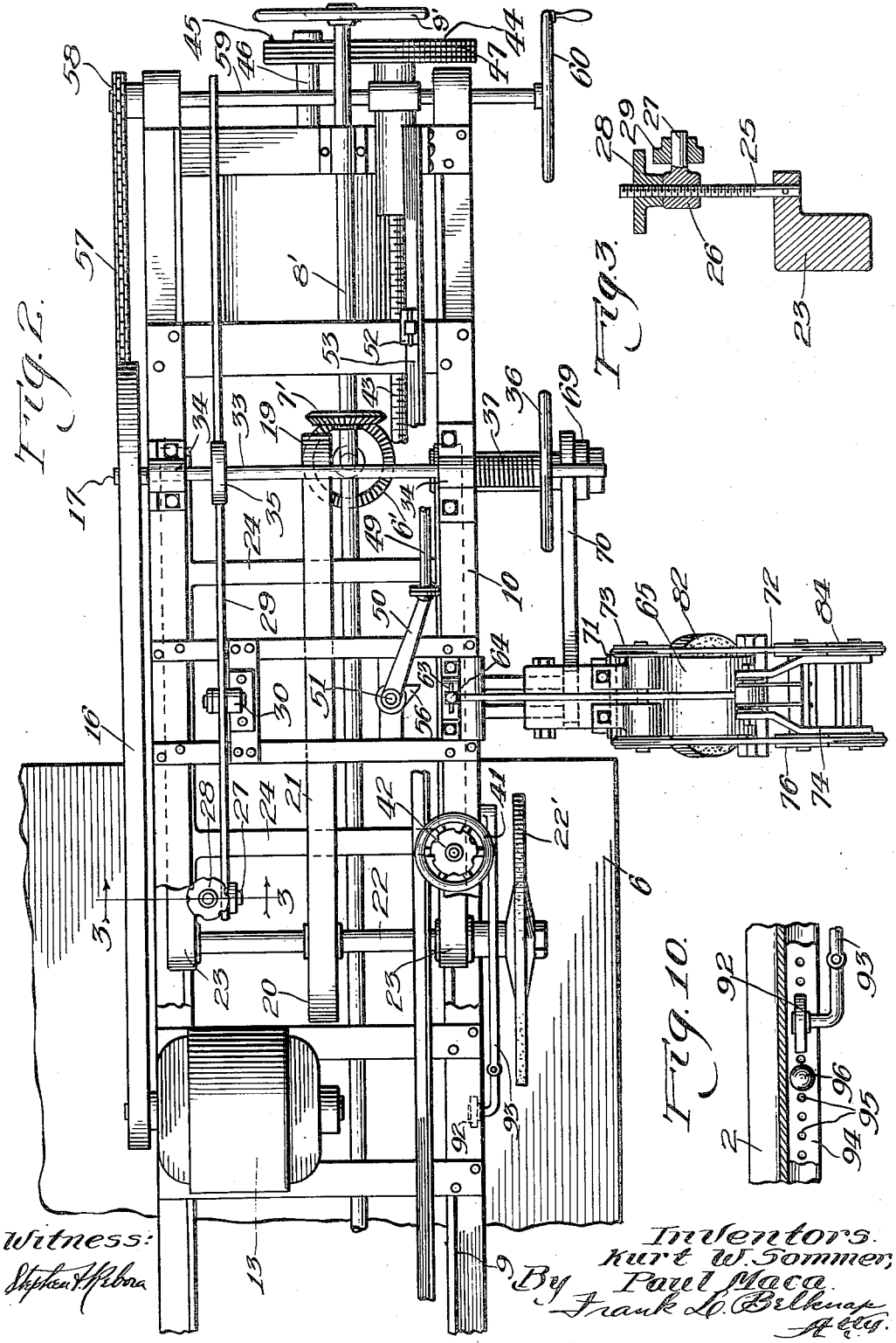

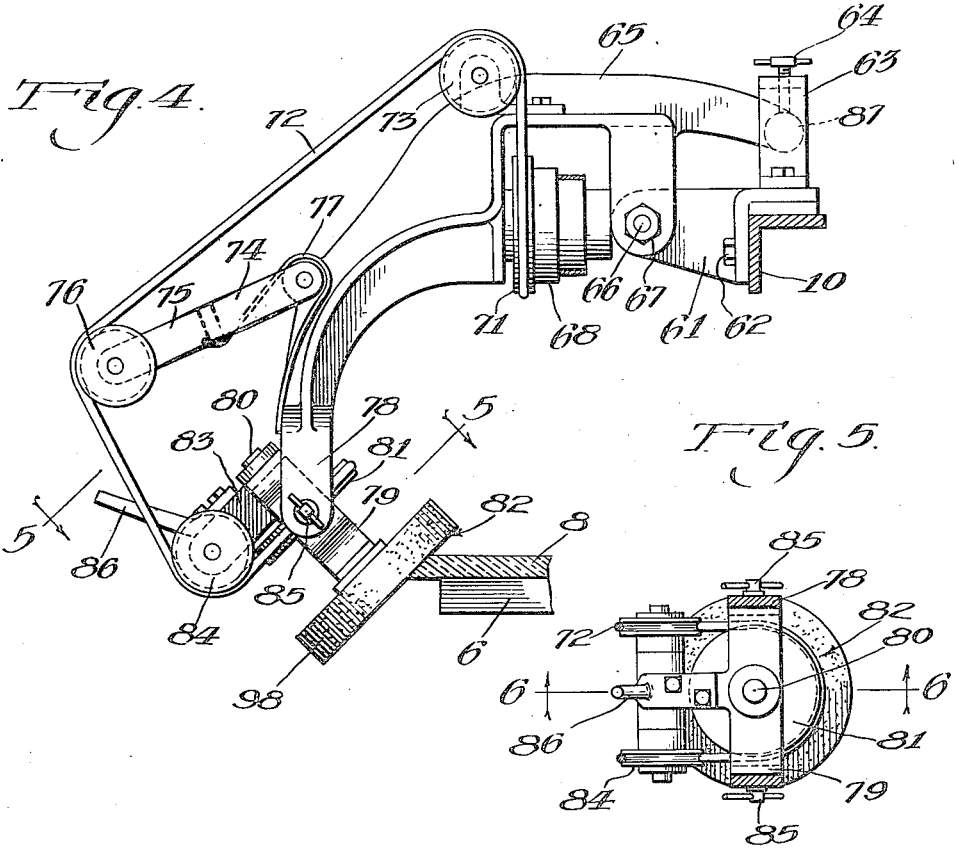
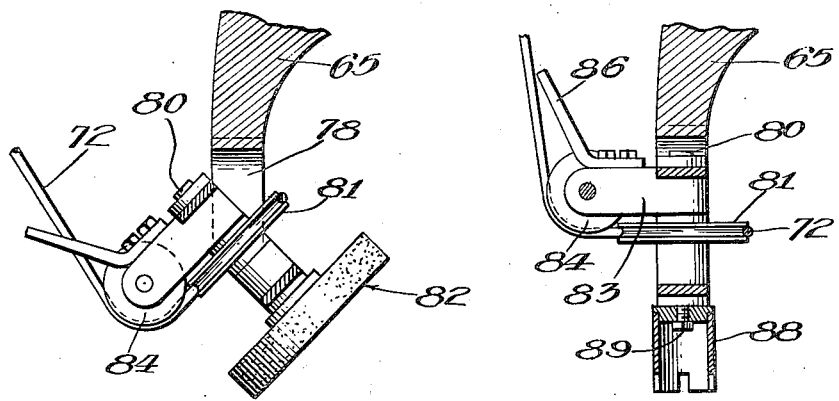

1,950,758

UNITED STATES PATENT OFFICE 1,950,758

GLASS MACHINE

Kurt W. Sommer and Paul Maca, Chicago, Ill., assignors to Sommer and Maca Glass Machinery Corporation, Chicago, Ill., a corporation of Illinois Application March 24, 1930, Serial No. 438,250

4 Claims. (Cl. 51—34)

This invention relates to improvements in a machine for working on glass, particularly plate glass, window glass, colored glass, such as Vitrolite, Sani-Onyx glass and the like, to produce borders or ribbon mitres upon the surface thereof, and to bevel, smooth and polish the edges of said glass.

In acting upon glass to produce borders or ribbon mitres upon the surface thereof, it has heretofore been the practice to dispose the glass upon a movable platform which is adapted to pass beneath a revolving wheel, which upon rotating cut or mitred the surface of the glass passing therebeneath. It can be readily seen, that a device of this character is necessarily awkward and cumbersome and occupies an enormous amount of space, due to the fact that the sheet of glass worked upon must be moved a distance equal to the length of the miter to be cut. In other words, the minimum area occupied by the machine must be at least twice the area of the largest piece of glass said machine is capable of operating upon. In addition, a machine of this character was controlled with difficulty, which resulted in mitres being cut of irregular depth.

Accordingly, one of the salient features of our invention resides in the provision of a machine for acting upon glass in the manner described and yet may occupy at most one-half the space occupied by machines heretofore used, and in addition, the provision of a machine having flexible, readily adjustable controls, resulting in the production of glass surfaces having mitres of uniform depth and of proper geometrical shape.

Heretofore, in emerying, smoothing, polishing and buffing beveled or straight edges of glass plates it has been the practice to maintain the operating wheel, whether it be a smoothing, polishing, buffing or emery wheel, in a fixed position, usually rotating in a horizontal plane, and hold the edge or bevel, either manually or otherwise, in contact with the revolving wheel. It can be readily seen that when acting upon extremely large glass plates the proper holding of the plate becomes a considerable problem.

Therefore, another important aspect of our invention contemplates the beveling, smoothing and polishing of the edges of glass plates while the glass remains in fixed position, the operating instrumentality for acting upon the glass being movable along the edges of the glass and adjustable for any desired angle of bevel.

A further important object of the present invention comprises the multiple use to which the beveling instrumentality may be susceptible, for example, the glass may be beveled or ground by the use of a carborundum wheel or the like; said carborundum wheel may be replaced by a cork wheel for smoothing, or a buffer wheel for polishing, or, if desired, a glass drill may be mounted in place of any of the wheels and holes may thereby be bored in the glass plate.

In addition to performing the operations hereinbefore enumerated, in a manner more efficient than has heretofore been possible the machine is characterized by its relative simplicity of operation and flexibility of adjustment, regulation and control.

Other and further important objects of the invention will be apparent from the accompanying drawings and following detail description.

In the drawings, Fig. 1 is a vertical elevation illustrating particularly the glass operating instrumentalities.

Fig. 2 is a top plan view of the device as shown in Fig. 1.

Fig. 3 is a sectional view taken on the line 3—3 of Fig. 2.

Fig. 4 is a detail elevational view of the beveling device.

Fig. 5 is a sectional view taken on line 5—5 of Fig. 4.

Fig. 6 is a sectional view taken on the line 6—6 of Fig. 5.

Fig. 7 is a detail sectional elevation illustrating particularly the use of the beveling device in connection with a glass drill.

Fig. 8 is a fragmentary sectional view of a portion of glass plate operated on by the machine.

Fig. 9 is a view similar to Fig. 8, illustrating a modification of the cut produced in the surface of the glass.

Fig. 10 is a fragmentary detail of the grinding wheel guide and track upon which said guide runs.

Referring more in detail to the drawings, 1 indicates a frame comprising a plurality of spaced parallel beams 2 supported by a plurality of legs 3. A sub-frame 4 may be mounted immediately beneath the main frame 1 and may support a plurality of I beams 5. A platform 6 may be supported by beams 5. The platform 6 may be adapted to be maintained stationary, or if desired, the same may be mounted upon rollers (not shown) and the beams 5 replaced by tracks (not shown) in which case the platform 6 may be movable. A glass plate 8 may be disposed upon the upper surface of the platform 6 and may be held in place thereon in any suitable manner.

The legs 3 may be provided at their lower ends with rollers 7 which may be adapted to roll upon and be supported by supports 1'. A rack 2' may be mounted upon the inner side of the support 1' and may co-operate with pinion 3' mounted on shaft 4', which in turn may be journalled upon frame 1 at the bearing 5'. A bevel gear 6' may be mounted upon the upper end of shaft 4' and may mesh with a co-operating bevel gear 7' mounted upon shaft 8' disposed parallel to frame 1. The shaft 8' may extend the entire length of the frame 1 and may have operatively associated with its opposite end (not shown) mechanism similar to gears 7', 6', shaft 4', gear 3', rack 2', etc. The shaft 8' may be manually rotated by means of wheel 9', or, of desired, may be power driven by obvious means (not shown). In this manner, as can readily be seen, the entire frame 1 may be movable over the platform 8 transversely to the length of said frame.

The upper portion of the beams 2 may be provided with tracks 9 upon which may be mounted a movable carriage 10 having supporting members 11 and wheels 12, said wheels being adapted to rest upon and be guided by tracks 9. A motor, or other suitable prime mover 13 may be mounted upon the carriage 10 by means of bolts 14 or the like, and may be operatively connected to a driving pulley 15 by means of a belt 16. The pulley 15 may be mounted upon shaft 17, which in turn may be journalled in bearings contained at the lower portion of hangers 18. A driving pulley 19 may also be mounted upon shaft 17 and is adapted to turn therewith, the pulley 19 being operatively connected to a driven pulley 20 by means of belt 21. Pulley 20 is mounted upon shaft 22, which also has mounted thereon a glass grinding wheel 22', the operation of which will be hereinafter more fully described.

The shaft 22 may be journalled in the ends of floating frame members 23, which may be suitably joined and reinforced by transverse braces 24. The opposite ends of the members 23 may be pivotally mounted on a bushing (not shown) within which the shaft 17 is journalled. A pin 25 may be rigidly mounted adjacent the free end of one of the members 23 and may extend upwardly therefrom. A collar 26 may be loosely mounted upon pin 25 and may be provided with a laterally projecting extension 27. An adjusting nut 28 may be threadedly mounted upon the upper end of the pin 25 and may be adapted to maintain collar 26 in position upon the pin 25. A balance bar 29 may be pivotally connected at one end to the extension 27, said bar being also pivotally mounted at bearing 30 upon a portion of the frame 10. The opposite end of the bar 29 may be provided with a counterweight 31 and by means of set screw 32 may be adjustably positioned along the length of said bar. In this manner it can be readily seen that the wheel 22' occupies more or less of a balanced relation with respect to the weight 31, and by suitably moving the weight 31 along the length of the bar 29 a desirable downward pressure may be imparted to the wheel 22'.

A shaft 33 may be transversely mounted in suitable bearings 34 upon the upper portion of the carriage frame 10. An eccentrically mounted cam 35 may be rigidly positioned upon the shaft 33, which in turn may be rotated by means of a hand wheel 36 or the like, the cam 35 being mounted upon the shaft 33 immediately above an intermediate portion of bar 29. Obviously, by rotating the cam 35 the weighted end of bar 29 will be depressed, thereby raising the wheel 22'. In this manner, whenever it is desired, the wheel 22' may be raised from the glass plate 8. In order to provide sufficient friction so that the cam 35 may be maintained in a desired position with respect to the bar 29, a spring 37 may be interposed between wheel 36 and the bearing 34.

A rod 38 may be pivotally connected to the free end of one of the members 23, as shown best at 39 in Fig. 1, and is adapted to extend upwardly through bushing 40 positioned upon carriage frame 10. The upper portion of the rod 38 may be threaded and may be provided with a co-operating adjusting nut 41. It can readily be seen that by means of this arrangement the downward travel of the members 23, and hence the wheel 22', may be conveniently controlled, and when an adjustment has been made the same may be maintained more or less permanent by lock nut 42 threadedly engaged upon the upper end of rod 38.

To provide movement of the carriage 10 upon tracks 9 a transmission screw 43 may be provided, said screw traversing the entire length of frame 1 and having mounted on one end thereof a sprocket wheel 44 which may co-operate with wheel 45 mounted upon shaft 46. A chain 47 may operatively connect wheels 44 and 45. Shaft 46 may be driven by motor 45' through a conventional change-speed mechanism 46'. It is to be understood, of course, that meshing gear wheels (not shown) may be substituted for the sprocket mechanism shown.

A clutch of conventional design (not shown) may be mounted upon the movable carriage 10 and may be adapted to engage with the screw 43. The engagement or disengagement of said clutch may be manually controlled by rods 49 and 50, which in turn rotate shaft 51, said shaft being operatively connected to the clutch. Automatic operation of the clutch may be provided by means of adjustable lugs 52, which may be mounted upon a bar 53 which traverses the entire length of travel of the carriage 10. The bar 53 may be suitably connected to frame 1 by means of upstanding supports 54. The lugs 52 may be provided with downwardly extending pins 55 which may contact cam 56, mounted upon shaft 51 upon movement of carriage 10, and hence automatically rotate said shaft and disengage the clutch, thereby stopping the forward travel of said carriage. If desired, the carriage 10 may be returned to its original position by automatic means, in which event the screw 43 may be rotated in the reverse direction by means readily apparent to those skilled in the art. To facilitate the return of the carriage 10 to its original position a sprocket chain 57 may be provided along the length of the frame 1, said sprocket chain being connected at one point to a portion of the carriage 10. The chain 57 may travel over a sprocket wheel 58 which may be mounted upon shaft 59. A hand wheel 60 may also be mounted upon said shaft and is adapted to rotate sprocket wheel 58, and hence move chain 57. Thus, carriage 10 can be quickly and conveniently returned to its original position.

Referring particularly to Fig. 4, a bracket 61 may be mounted upon frame 10 by means of bolts 62 or the like. An inverted U-shaped housing 63 may be mounted upon said bracket 61 and may be provided with an adjustable thumb screw 64, the function of which will be hereinafter more fully described. A cantilever arm 65 may be pivotally mounted upon bracket 61 at the point 66, the pivotal mounting comprising a loosely fitting bolt 67. A step-cone pulley 68 may be rotatably mounted upon the arm 65 and may be adapted to cooperate with a corresponding step-cone pulley 69 mounted upon shaft 17, a belt 70 being adapted to connect said pulleys 68 and 69.

A grooved pulley or sheave wheel 71 may be rigidly connected to pulley 68 and is adapted to turn therewith. A continuous strap or belt 72 may pass over the wheel 71 and thence over a pair of guide wheels 73 mounted upon the arm 65 immediately above the wheel 71. A bifurcated arm 74 may be pivotally mounted at one end upon an intermediate portion of the arm 65. At the termination of the prongs 75 comprising the bifurcated arm 74 may be mounted sheave wheels 76 over which the belt 72 is adapted to pass. A spring 77 may cooperatively engage arm 74 and arm 65 by which arrangement, it can be readily seen, the arm 74 in connection with the wheels 76 may serve as a belt tightener.

The cantilever arm 65 may terminate at one end in bifurcated arms 78. An element 79 may be pivotally mounted between said arms 78 and is adapted to support and provide bearings for a shaft 80. A pulley wheel 81 may be mounted on the shaft 80 within the element 79, and one end of said shaft may terminate outside of the element 79 and may have mounted thereon a bevelling wheel 82. The wheel 82 may take the form of a grinding wheel, such as a carborundum wheel, or the like, or may be a cork or wood smoothing wheel, or if a high polish is to be imparted to the beveled glass, wheel 82 may take the form of a felt buffing wheel. The element 79 may be provided with an extension 83 which is adapted to support guide wheels 84 over which belt 72 may pass, the said belt completing its path of travel over the driven wheel 81. The element 79 may be made to assume any desired angular position, thereby positioning the wheel 82 at a desired angle with respect to the glass plate 8 mounted on paltform 6. To maintain wheel 82 in this desirable angular position lock nuts 85 may be provided at the pivotal juncture of the arm 78 and the element 79. To facilitate the task of angularly positioning wheel 79 a handle 86 may be mounted upon the extension 83.

It can be readily seen that the driving arrangement heretofore described is such that, regardless of the angular position of the wheel 82, the belt 72 may be maintained under tension. This feature is brought about by the provision of the spring-operated arm 74 which is capable of adjusting itself to the varying angular positions of the wheel 82.

The opposite end of the cantilever arm 65 may be positioned within the inverted U-shaped housing 63, as shown at 87 in Fig. 4. The arrangement is such that by suitably manipulating the screw 64 the bifurcated end of the arm 65 may be raised or lowered, as desired. It can be seen that inasmuch as the pulley 68 is mounted on the arm 65 and the cooperating pulley 69 is mounted on frame 10, that upon rocking the arm 65 pulley 68 may assume a position out of line with the pulley 69. However, it is to be understood that the arc through which the end 87 of the arm 64 may move is relatively small and is not of sufficient magnitude to interrupt the operation of the belt 70.

If desired wheel 82 may be replaced by a conventional glass drill 88, which may be mounted upon the shaft 80 by means of a screw 89 or the like. In this case the element 79 may be locked in a vertical position so that the cutting edges of the drill 88 will always occupy a position normal to the surface of the glass 8. The drill 88 may take the form of a soft metal drill to be used in connection with abrasive powder if large holes are to be drilled in the glass, or if small holes are to be drilled a diamond point drill may be similarly mounted upon the shaft 80. The drilling speeds necessary to drill holes of various diameters may be obtained, as is obvious, by the cooperating step-cone pulleys 68 and 69.

In operation, if it is desired to act upon the surface of the glass plate 8 in order to cut a ribbon mitre, as shown at 90 in Fig. 8, or a triangular miter, as shown at 91 in Fig. 9, a suitable grinding wheel 22' may be mounted upon shaft 22. The wheel 36 may be rotated so that the grinding wheel 22' may be raised above the surface of the glass plate 8 and the counterweight 31 may be so positioned along the bar 29 that a desirable normal pressure may be exerted upon the wheel 22'. The glass plate 8 may be mounted upon the platform 6 and maintained in fixed position thereon by means of clamps (not shown).

The wheel 22' may then be lowered to the surface of the glass 8 and by means of the adjusting wheel 41 the depth to which the wheel 22' may cut may be controlled. Motor 13 may then be started and simultaneously therewith the clutch rod 49 may be manipulated to engage the clutch with the screw 43. In this manner the carriage 10 with the wheel 22' rotating in contact with the glass 8 will be carried forward and, as can be readily seen, a constant uniform pressure will be exerted upon wheel 22' along its entire path of travel over the glass plate 8.

If desired, a plurality of glass plates may be acted upon in series so as to cut a mitre across a predetermined portion of their surfaces. This operation is commonly carried out in producing a mitred border upon mirrors, fancy windows and the like. To produce this type of border upon a plurality of plates in a continuous operation is one of the salient features of our invention and may be accomplished by positioning the plates side by side upon the platform 6. A guide wheel may be positioned upon the end of an arm 93, which in turn may be mounted upon one of the arms 23. A track 94 provided with a series of apertures 95, may be mounted upon the web of one of the beams 2, said apertures being provided for the reception of buttons 96 having substantially mushroom-shaped heads. The wheel 92 may be guided over track 94 and may contact the buttons 96 whenever wheel 22' may approach the juncture of adjacent glass plates upon the platform 6. In this manner, as can be readily seen, the wheel 22' may be raised from the surface of the plates when wheel 92 passes over a button head and thereafter return in contact with the surface of the next adjacent glass plate. By this means the wheel 22' may be automatically rendered inoperative with respect to the work at predetermined intervals in the travel of the carriage 10.

If desired, a bevel may be cut along the edge of the glass plate 8 simultaneously with the cutting of the surface by the wheel 22'. This operation may be carried on by means of the wheel 82 positioned in suitable angular relationship with respect to the edge of the glass plate 8, or, as has heretofore been described, a previously cut beveled edge may be smoothed or polished simultaneously with the operation of the wheel 22' merely by interchanging the wheels 82.

By means of the floating mechanism utilized in connection with the wheel 22' if glass such as common window glass is to be mitred, the depth of the mitred cut may always be made uniform inasmuch as the speed of travel of the wheel 22' is constant, the speed of travel of the carriage 10 is constant and the weight or force exerted normally upon the floating end of the arms 23 is constant, regardless of the unevenness of the surface of the glass a uniform depth of miter may be obtained.

To facilitate the bevelling of the glass plate 8 the wheel 82 may rotate in a plane slightly canted from the plane of the bevel, that is, the portion of the face of the wheel in contact with the edge of the glass may be, for example, the rear half portion. If this were not the case, the edge 98 would be continually abutting the un-bevelled edge of the glass in the forward path of travel of the wheel 82. This feature is not brought out in the drawings inasmuch as the canted position of the wheel 82 is relatively so small that it is deemed confusion would result.

We claim:

1. In combination, a support for supporting a glass plate, a frame disposed above said support, a movable carriage positioned upon said frame, means for moving said carriage, and means mounted on said movable carriage for operating on said glass plate supported on said support, comprising a rotating grinding wheel, means for applying the grinding surface of said wheel to the glass under a predetermined uniform pressure comprising a frame pivotally mounted at one end on the carriage, a bar pivotally mounted upon the carriage and connected at one end to the opposite end of said pivotally mounted frame and an adjustable counterweight positioned upon the opposite end of said bar, the grinding wheel being mounted upon the balanced end of said pivotally mounted frame, and means for automatically raising the grinding wheel from the surface of the glass at predetermined intervals along the travel of the carriage.

2. In combination, a support for supporting a glass plate, a frame disposed above said support, a movable carriage positioned upon said frame, means for moving said carriage, and means mounted on said movable carriage for operating on said glass plate supported on said support, comprising a rotating grinding wheel, means for applying the grinding surface of said wheel to the glass under a predetermined uniform pressure comprising a frame pivotally mounted at one end on the carriage, a bar pivotally mounted upon the carriage and connected at one end to the opposite end of said pivotally mounted frame and an adjustable counterweight positioned upon the opposite end of said bar, the grinding wheel being mounted upon the balanced end of said pivotally mounted frame, and means for automatically raising the grinding wheel from the surface of the glass at predetermined intervals along the travel of the carriage, comprising an arm mounted upon the balanced end of said pivotally mounted frame, a contacting member mounted upon the end of said arm, a track disposed upon the frame parallel to said glass support, said contacting member being adapted to ride upon said track, and upraised buttons removably positioned upon said track over which said contacting member passes.

3. In combination, a support for supporting a glass plate, an independently supported frame disposed above said support, a movable carriage mounted upon said frame, means for moving said carriage along the length of said frame, and means upon the carriage for bevelling the edge of the glass plate while said plate is in stationary horizontal position, comprising a cantilever arm pivotally mounted upon said carriage and a grinding wheel operatively positioned upon the end of said arm, means for swinging said arm about its pivotal mounting to dispose said wheel adjacent or remote from the edge of said plate, and means for adjustably positioning said wheel in a desired angular position with respect to the edge of the glass plate comprising a block pivotally mounted at the end of the arm, a shaft journalled in said block, the grinding wheel being mounted upon one end of said shaft, and means for driving said grinding wheel from said carriage.

4. In combination, a support for supporting a glass plate, a frame disposed above said support and mounted upon a separate support, a movable carriage mounted upon said frame, means for moving said carriage along the length of said frame, and means upon the carriage for bevelling an edge of the glass plate while said plate is in stationary horizontal position, comprising a cantilever arm pivotally mounted upon said carriage, a block pivotally carried at the unsupported end of said arm, a shaft journalled in said block, a grinding wheel mounted upon said shaft, a pair of sheave wheels mounted upon said arm, a pair of sheave wheels mounted upon said block, a belt adapted to pass over said sheave wheels, a pulley mounted upon said shaft around which said belt passes, means for driving said belt, and resilient means mounted upon said arm to keep said belt taut regardless of the angular position of said block with respect to said arm.

KURT W. SOMMER.
PAUL MACA.